US012610274B2

(12) United States Patent
Báder et al.

(10) Patent No.: US 12,610,274 B2
(45) Date of Patent: Apr. 21, 2026

(54) NETWORK CELL CLASSIFICATION FOR QOS POLICY OPTIMIZATION

(71) Applicant: Telefonaktiebolaget LM Ericsson (publ), Stockholm (SE)

(72) Inventors: Attila Báder, Paty (HU); Gergely Dévai, Budapest (HU); Dinand Roeland, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 331 days.

(21) Appl. No.: 18/269,661

(22) PCT Filed: Jan. 8, 2021

(86) PCT No.: PCT/IB2021/050132
§ 371 (c)(1),
(2) Date: Jun. 26, 2023

(87) PCT Pub. No.: WO2022/148995
PCT Pub. Date: Jul. 14, 2022

(65) Prior Publication Data
US 2024/0064554 A1 Feb. 22, 2024

(51) Int. Cl.
*H04W 28/02* (2009.01)
(52) U.S. Cl.
CPC .............................. *H04W 28/0268* (2013.01)
(58) Field of Classification Search
None
See application file for complete search history.

(56) References Cited

U.S. PATENT DOCUMENTS 9,055,557 B1 6/2015 Bayar et al.
9,295,070 B2 3/2016 Damola
(Continued)

FOREIGN PATENT DOCUMENTS

EP 3225046 A1 10/2017
WO 2016095826 A1 6/2016
WO 2021259529 A1 12/2021

OTHER PUBLICATIONS

U.S. Appl. No. 63/121,387, filed Dec. 4, 2020. (Year: 2020).*
3rd Generation Partnership Project, "3rd Generation Partnership Project; Technical Specification Group Services and System Aspects; System architecture for the 5G System (5GS); Stage 2 (Release 16)", Technical Specification, 3GPP TS 23.501 V16.6.0, 2020-09, pp. 1-418, 3GPP, France.
(Continued)

*Primary Examiner* — Andre Tacdiran
(74) *Attorney, Agent, or Firm* — COATS & BENNETT, PLLC

(57) ABSTRACT

Wireless network cells are classified into groups based on radio and network conditions in the cells. Quality of Service, QoS, policy optimization is then performed per each classified cell group, by selecting more or less stringent predetermined rules until a target Quality of Experience, QoE, is met, at least for the highest priority traffic. To classify the cells into groups, the radio and network parameters collected (110) are ranked (112) by their influence on QoE. Based on this ranking, only a few of the most impactful parameter are selected (114). The range of values of each parameter is then divided (116) into a plurality of ranges, for example by the ability of the parameter, when within each range, to impact service quality. Cells are then classified (118) into groups based on the same parameters within the cells falling into the same value ranges. QoE targets for at least high priority traffic classes are obtained (120). QoS policy is then optimized (122), separately for each classified cell group, to meet the QoE targets. The optimized QoS policy is applied (124) to a new UE entering a cell.

20 Claims, 6 Drawing Sheets

(56) References Cited

U.S. PATENT DOCUMENTS

| 9,712,400 | B1 | 7/2017 | Gegout et al. | |
| 9,794,145 | B2 | 10/2017 | Vasseur et al. | |
| 10,506,558 | B2 | 12/2019 | Zhang et al. | |
| 10,547,563 | B2 | 1/2020 | Zhang et al. | |
| 10,897,424 | B1 | 1/2021 | Dhanabalan et al. | |
| 10,944,641 | B1 | 3/2021 | Zacks et al. | |
| 10,986,516 | B2 | 4/2021 | Dao et al. | |
| 11,140,047 | B2 | 10/2021 | Shan | |
| 11,558,813 | B2 | 1/2023 | Park et al. | |
| 11,678,252 | B2 | 6/2023 | Dao et al. | |
| 11,838,799 | B2 | 12/2023 | Zhang et al. | |
| 11,864,019 | B2 | 1/2024 | Li et al. | |
| 2009/0247163 | A1* | 10/2009 | Aoyama | H04W 48/10 |
| | | | | 455/436 |
| 2012/0002541 | A1* | 1/2012 | Lee | H04W 28/22 |
| | | | | 370/230 |
| 2015/0304737 | A1 | 10/2015 | Franklin et al. | |
| 2017/0289047 | A1 | 10/2017 | Szilagyi et al. | |
| 2017/0332282 | A1 | 11/2017 | Dao | |
| 2019/0124555 | A1 | 4/2019 | Szilagyi et al. | |
| 2020/0029240 | A1* | 1/2020 | Li | H04W 24/02 |
| 2020/0029253 | A1* | 1/2020 | Yan | H04W 64/00 |
| 2020/0112907 | A1 | 4/2020 | Dao et al. | |
| 2020/0196169 | A1 | 6/2020 | Dao et al. | |
| 2020/0305201 | A1* | 9/2020 | Lei | H04W 72/0473 |
| 2020/0328947 | A1* | 10/2020 | Iwai | H04L 47/24 |
| 2021/0029043 | A1 | 1/2021 | Dhanabalan et al. | |
| 2021/0092062 | A1 | 3/2021 | Dhanabalan et al. | |
| 2022/0038946 | A1* | 2/2022 | Kim | H04W 28/0284 |
| 2022/0057791 | A1 | 2/2022 | Saraf et al. | |
| 2022/0151004 | A1 | 5/2022 | Sedlacek et al. | |
| 2022/0182718 | A1* | 6/2022 | Yelda | H04L 67/568 |
| 2023/0081673 | A1 | 3/2023 | Junkins et al. | |
| 2023/0246903 | A1* | 8/2023 | Huet | H04L 43/08 |
| | | | | 709/224 |

OTHER PUBLICATIONS

3rd Generation Partnership Project, "3rd Generation Partnership Project; Technical Specification Group Services and System Aspects; Study of Enablers for Network Automation for 5G(Release 16)", Technical Report, 3GPP TR 23.791 V16.2.0, Jun. 2019, pp. 1-124, 3GPP, France.

3rd Generation Partnership Project, "3rd Generation Partnership Project; Technical Specification Group Services and System Aspects; Management and orchestration; Architecture framework(Release 16)", Technical Specification, 3GPP TS 28.533 V16.5.1, Sep. 2020, pp. 1-31, 3GPP, France.

3rd Generation Partnership Project, "3rd Generation Partnership Project; Technical Specification Group Services and System Aspects; Architecture enhancements for 5G System (5GS) to support network data analytics services(Release 16)", Technical Specification, 3GPP TS 23.288 V16.5.0, Sep. 2020, pp. 1-64, 3GPP, France.

3rd Generation Partnership Project, "3rd Generation Partnership Project; Technical Specification Group Services and System Aspects; System architecture for the 5G System (5GS); Stage 2 (Release 16)", Technical Specification, 3GPP TS 23.501 V16.3.0, Dec. 2019, pp. 1-394, 3GPP, France.

3rd Generation Partnership Project, "3rd Generation Partnership Project; Technical Specification Group Services and System Aspects; Management and orchestration; Architecture framework (Release 16)", Technical Specification, 3GPP TS 28.533 V16.2.0, Dec. 2019, pp. 1-29, 3GPP, France.

3rd Generation Partnership Project, "3rd Generation Partnership Project; Technical Specification Group Services and System Aspects; Architecture enhancements for 5G System (5GS) to support network data analytics services (Release 16)", Technical Specification, 3GPP TS 23.288 V16.3.0, Mar. 2020, pp. 1-60, 3GPP, France.

* cited by examiner $$\frac{\Delta QoE1}{\Delta P1} > \frac{\Delta QoE2}{\Delta P2}$$

LIST AND RANK OF RADIO PARAMETERS
CONTRIBUTING MOST TO THE QoE CHANGES

O   Value of P with all other parameters in good range
x   Value of P with all other parameters in fair or bad range

RNDA-CCF 28

NETWORK PARAMETERS
AND QoE OBTAINING  UNIT
60

NETWORK PARAMETERS
RANKING UNIT
62

PARAMETER SELECTING
UNIT
64

VALUE RANGE
DETERMINING UNIT
66

CELL CLASSIFYING UNIT
68

POF 30

QoE TARGETS
OBTAINING UNIT
70

QoS POLICY OPTIMIZING
UNIT
72

NETWORK CELL CLASSIFICATION FOR QOS POLICY OPTIMIZATION

TECHNICAL FIELD

The present invention relates generally to wireless communication networks, and in particular to a system and method of classifying cells into groups having similar performance for Quality of Service (QoS) policy optimization.

BACKGROUND

Wireless communication networks, including network nodes and radio network devices such as cellphones and smartphones, are ubiquitous in many parts of the world. These networks continue to grow in capacity and sophistication. To accommodate both more users and a wider range of types of devices that may benefit from wireless communications, the technical standards governing the operation of wireless communication networks continue to evolve. The Third Generation Partnership Project (3GPP) developed the fourth generation (4G) of network standards, known as Long Term Evolution (LTE), which has been deployed. The fifth generation (5G, also known as New Radio, or NR) is in an advanced development stage. Both LTE and NR follow the "cellular" network model, which features a plurality of fixed network nodes (known variously as base station, radio base station, base transceiver station, serving node, NodeB, eNodeB, eNB, gNB, and the like), each providing wireless communication service to a large plurality of mobile devices (known variously as mobile terminals, User Equipment or UE, and the like) within a generally fixed geographical area, known as a cell or sector. The UE and eNB/gNB form the Radio Access Network (RAN); other nodes (which may not have radio communication capability) form the Core Network (CN).

Managing network operations and the quality of communications has always been a primary challenge of operating a wireless communication network, and the increasing size and complexity of networks greatly exacerbates this challenge. Technical aspects of network communication quality are defined in Service Level Agreements (SLA) between the network operators and the businesses that purchase network services. The latest version of the 3GPP Technical Specification 23.501, incorporated herein by reference in its entirety, describes the 5G Quality of Service (QoS) Indicator (5QI) as a reference to QoS forwarding behavior.

5G QoS Identifier: A scalar that is used as a reference to a specific QoS forwarding behaviour (e.g. packet loss rate, packet delay budget) to be provided to a 5G QoS Flow. This may be implemented in the access network by the 5QI referencing node specific parameters that control the QoS forwarding treatment (e.g. scheduling weights, admission thresholds, queue management thresholds, link layer protocol configuration, etc.).

Packet delay budget in 5QIs includes delay both in the RAN and the CN. In addition to standardized 5QI values, network service providers may define their own custom 5QIs.

In 5G, each PDU session contains one or more QoS Flows.

5G QoS Flow: The finest granularity for QoS forwarding treatment in the 5G System. All traffic mapped to the same 5G QoS Flow receive the same forwarding treatment (e.g. scheduling policy, queue management policy, rate shaping policy, RLC configuration, etc.). Providing different QoS forwarding treatment requires separate 5G QoS Flow Each QoS Flow belongs to a 5QI class.

Packet error rate and packet delay budget are target values for non-congestion situations—that is, they may be violated if the load of a certain network elements is higher than its capacity. These congestion situations (when the system cannot fulfill the requirements of all the QoS Flows) are to be handled according to the assigned priority: higher priority traffic is to be prioritized over lower priority traffic. Thus, in congestion situations, the lowest priority traffic shall be the first to violate the error rate and delay targets, while higher priority traffic shall meet those targets until a further increase in the load.

QoS metrics relate to the network, e.g., packet error rate, packet latency or delay, etc. Another measure of service quality, which relates more to subjective user satisfaction, is Quality of Experience (QoE). Clearly, these metrics are correlated, as delayed or dropped data packets will degrade the user experience. Hence, QoE is also related to the service class of QoS Flows, as specified in SLAs. Key Performance Indicators (KPI) related to QoE can be provided by Application Functions with which users interact, by Machine Learning (ML) algorithms, and the like. 5QIs reference specific QoS policies, which are technical metrics enforced in the network by a Policy Control Function (PCF). 5QIs thus indirectly control user QoE.

3GPP Technical Report 23.791 lists use cases related to QoS policies, e.g., deriving suitable QoS profiles and adjustment of these profiles, such as by utilizing network metrics collected by a Network Data Analytics Function (NWDAF). The use cases depend on the correct realization of the 5QIs.

The large number of 5QI classes available in 5G mobile networks, as well as the large number of traffic and service types, makes it difficult to manually find or map the appropriate 5QIs to traffic types in 5G networks. Such a task would require extensive traffic lab measurements as well. Selecting the right 5QI class is an important factor in fulfilling SLAs and internal operator business goals defined in terms of QoS or QoE targets. If an SLA requirement is not met, then the traffic should be mapped to a different 5QI value manually, which is time-consuming, and does not scale when there are numerous 5QI values to be checked and changed.

Indian Patent Application No. 2020/11026696, titled "Traffic Forwarding Policy Determination in a Wireless Communication System," filed Jun. 24, 2020, and assigned to the assignee of the present disclosure, describes an efficient 5QI policy learning and optimization method. Briefly, the method can be conceptualized as plotting measured network performance parameters along, e.g., packet error rate and packet delay axes, with each plotted data point indicating whether a QoE target is met. 5QI classes can be plotted as rectangles, based on their packet error rate and packet delay targets. The ratio of measured parameters meeting vs. not meeting QoE targets within each rectangle is an indication of how well the associated 5QI class will fulfil the QoE target. A cost (e.g., in network resources) can be associated with each 5QI class, and hence each rectangle. Appropriate 5QI classes are then selected based on their ability to fulfil the QoE target and their relative costs. Other methods may be devised to automate the task of discovering appropriate 5QIs, based on measurements of network performance.

Automatic QoS policy optimization methods, such as the one described above, are able to adjust and find the optimum 5QI for SLA traffic globally to the network. In practice, wireless traffic distribution and load, as well as the radio conditions in different cells, is very uneven. For example, a dense urban region includes many cells with poor radio conditions—coverage holes, high cell density and high cell load leading to interference, and the like. In contrast, rural areas may be lightly loaded with low interference. Applying a QoS policy to the network globally can result in a situation in which a QoE target meets a specific SLA criterion—for example, 90% of the cells meet the QoE target. However, it is fulfilled in a way that in rural areas, the QoE is met with 100% and network resources are oversubscribed, but in some urban cells the service is poor. While the SLA criterion is met globally, many users still experience unacceptable level of service.

Another problem with the global algorithm is that it can lead to a 5QI allocation, to compensate different radio issues, which is too stringent, meaning more network resource are allocated than necessary to fulfill SLA requirements. For example, consider a network having cells with different radio issues. In some cells the interference is high, causing more packet loss than tolerable by the SLA. In other cells the HARQ retransmission rate is high, causing higher delay. In still other cells there exist coverage holes, with weak signals, so more Physical Resource Blocks (PRB) are needed to deliver the same bits in the radio. The global algorithm tries to solve the issue globally; therefore, it allocates the SLA traffic to a 5QI class which ensures smaller delay, lower loss, and higher priority at the same time, requiring more PRBs, higher scheduler priority, etc. This 5QI class is applied in each cell in the radio, improving overall QoE to meet the SLA, but at a high cost in network resource. As a result, other traffic in lower 5QI classes can suffer.

In theory, these algorithms could be run per-cell or per-eNB/gNB, which would solve the problem described above. However, in practice this is not feasible due to the very large number of cells (i.e., 100,000 or more in a large network). Furthermore, identifying the right 5QI for a traffic flow or traffic class requires sufficiently large measurement samples, which are not available for each cell.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention disclosed and claimed herein, network cells are classified into groups based on radio and network conditions in the cells. QoS policy optimization is then performed per each classified cell group, by selecting more or less stringent 5QI rules until a target QoE is met, at least for the highest priority traffic. To classify the cells into groups, the radio and network parameters collected are ranked by their influence on QoE. Based on this ranking, only a few of the most impactful parameter are selected. The range of values of each parameter is then divided into a plurality of ranges, for example by the ability of the parameter, when within each range, to impact service quality. In one such division, the parameter value ranges are characterized as "good," "fair," and "bad" values for that parameter. Cells are then classified into groups based on the same parameters within the cells falling into the same value ranges. For example, all cells experiencing "good signal strength," "bad signal quality," and "medium (fair) traffic load" would be classified into the same group. QoE targets for at least high priority traffic classes are obtained, such as from SLAs. QoS policy for the high priority traffic classes is then optimized, separately for each classified cell group, to meet the QoE targets. This approach optimizes QoS policy based on actual radio and network parameters in each cell, which achieves better results than a global optimization approach, which can achieve QoE targets globally but leave individual cells with sub-par performance. On the other hand, the approach avoids the massive computation load that would be required to perform QoS policy optimization individually for each cell in the network. For each classified cell group, a QoS policy optimized for the conditions that characterize that group is applied to all cells in the group. On an ongoing basis, as a UE moves into a new cell, the optimized QoE policy for the classified cell group containing that cell is applied to at least high priority traffic classes to/from that UE.

One embodiment relates to a method of classifying cells in a wireless communication network for QoS policy optimization. Measurements of radio network and traffic load parameters, and estimates of user QoE, are obtained on a per cell basis. The radio network and traffic load parameters are ranked by their influence on QoE. A subset of the highest ranked parameters is selected. A plurality of value ranges for each of the selected parameters is determined. Cells are classified into groups based on the value ranges of the selected parameters.

In a further embodiment, QoE targets for at least high priority traffic classes are obtained. QoS policy for the high priority traffic classes is optimized, separately for each classified cell group, to meet the QoE targets.

In a still further embodiment, a cell's optimized QoS policy is applied to a UE entering the cell from a cell having a different QoS policy.

Another embodiment relates to a network node operative in a wireless communication network. The network node includes communication circuitry configured to communicate with other network nodes, and processing circuitry operatively connected to the communication circuitry. The processing circuitry is configured to obtain, per cell, measurements of radio network and traffic load parameters, and estimates of user Quality of Experience, QoE; rank the radio network and traffic load parameters by their influence on QoE; select a subset of the highest ranked parameters; determine a plurality of value ranges for each of the selected parameters; and classify cells into groups based on the value ranges of the selected parameters.

In a further embodiment, the processing circuitry is configured to obtain QoE targets for at least high priority traffic classes; and optimize QoS policy for the high priority traffic classes, separately for each classified cell group, to meet the QoE targets.

In a still further embodiment, the processing circuitry is configured to apply a cell's optimized QoS policy to a UE entering the cell from a cell having a different QoS policy.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
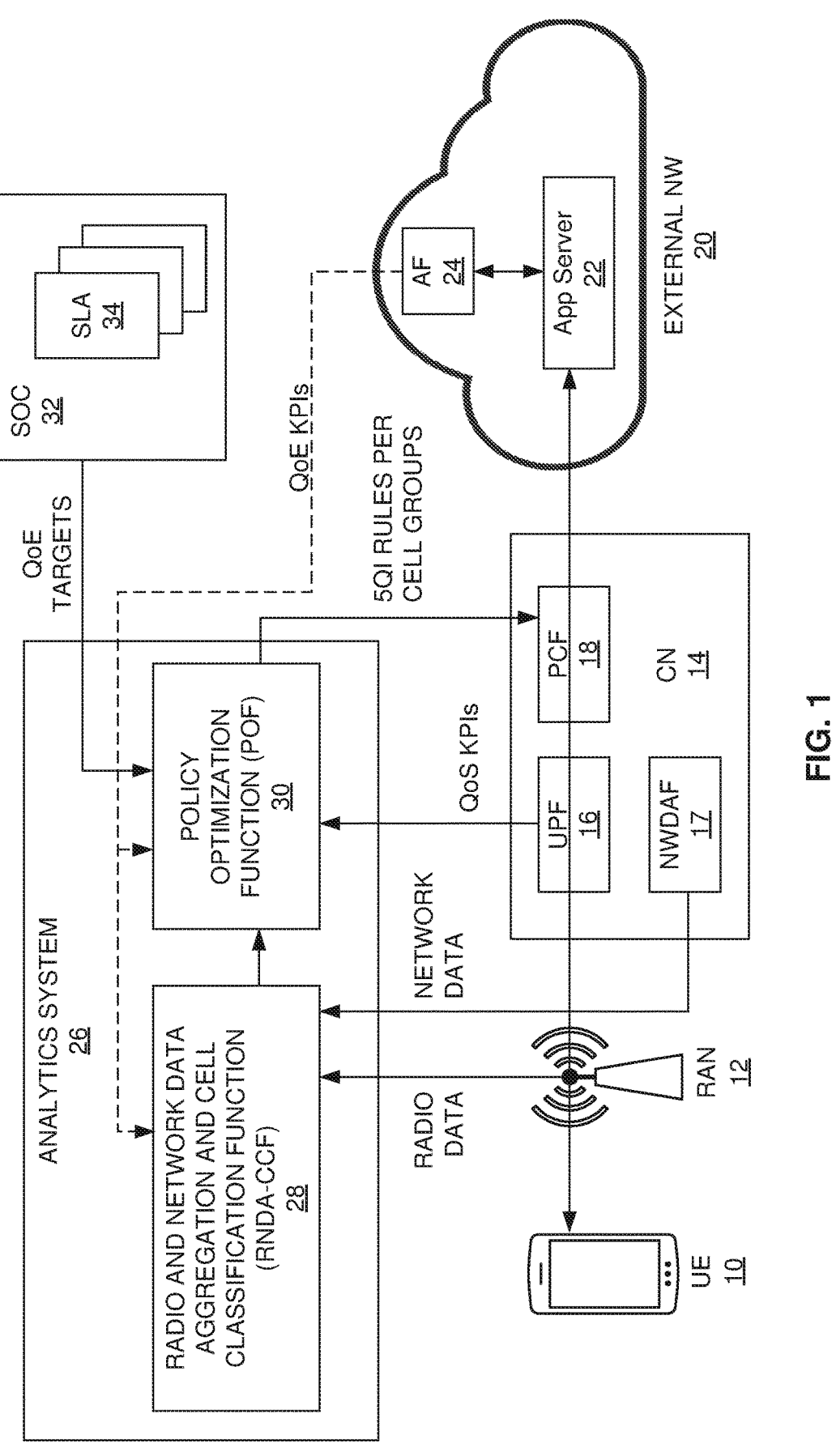
FIG. 1 is a block diagram of relevant portions of a wireless communication network.

FIG. 1 depicts the relevant portions of a wireless communication network in a representative embodiment of the present invention. The basic network components—presented in FIG. 1 as a 3GPP 5G network, although embodiments of the present invention are not limited to this application—are known to those of skill in the art. In particular, a User Equipment (UE) 10 connects, via a Radio Access Network (RAN) 12, to the Core Network (CN) 14. The UE interacts with numerous network functions in the CN 14; those relevant to the present disclosure include the User Plane Function (UPF) 16 and the Policy Control Function (PCF) 18. A Network Data Analytics Function (NWDAF) 17 collects and analyzes network performance data. The CN 14 connects to an external network 20 (e.g., the Internet), which includes an application server 22 and application function 24. A Service Operation Center (SoC) 32 specifies and monitors network operation to maintain service quality. Technical specifications defining minimum network performance metrics for various classes of service are defined in Service Level Agreements (SLA) 34. The functions and protocols of these network components are defined in various network specifications, such as 3GPP Technical Specifications.

An analytics system 26 performs cell classification and policy optimization according to embodiments of the present invention. The analytics system 26 could be implemented as part of the 5G NWDAF 17 or Management Data Analytics Service (MDAF). Alternatively, the analytics system 26 may be implemented in any network function or node having the requisite connectivity and computational capability. Within the analytics system 26, a Radio and Network Data Aggregation and Cell Classification Function (RNDA-CCF) 28 collects radio and network data, analyzes it, and classifies cells into groups based on network performance. A Policy Optimization Function (POF) 30 then optimizes QoS policies for each classified cell group, assigning more stringent 5QIs (and hence allocating more network resources) to cell groups exhibiting poor performance, and relaxing the 5QIs (and hence dedicating fewer network resources) to cell groups having good performance. In this manner, the overall network operation is optimized according to actual network performance (as opposed to global solutions that both over- and under-allocate resources), while keeping the computational load at a tractable level (as opposed to a per-individual-cell monitoring and optimization).

In greater detail, the RNDA-CCF 28 obtains, on a per cell basis, measurements of radio network and traffic load parameters, e.g., by subscribing to a NWDAF 17 monitoring service. The RNDA-CCF 28 also obtains estimates of current user Quality of Experience (QoE), such as by receiving QoE Key Performance Indicators (KPI) from AFs 24. The RNDA-CCF 28 constrains the computational load by ranking the radio network and traffic load parameters by their influence on QoE, and selecting only a subset of the highest ranked parameters for further analysis. The selected parameters are divided into a plurality of value ranges—which may be abstracted, for example, as "good," "fair," and "bad" values for each parameter. The RNDA-CCF 28 then classifies cells into groups based on the value ranges of the selected parameters. In this manner, different cells, which may be geographically distant but are experiencing the same network performance issues, are classified into the same group, as the same QoS policy optimization would benefit all of the cells in that group. The network data collection is ongoing (i.e., periodic or continuous). The parameter analysis and cell classification may occur infrequently, such as per day.

The POF 30 receives QoE targets from the SoC 32 (such as from SLAs 34), as well as estimates of actual user QoE for at least high priority traffic classes. On a per classified cell group basis, the POF 30 optimizes the QoS policy for at least high priority traffic classes by adjusting the 5QI rules, to bring actual QoE in line with QoE targets for each traffic class. The POF 30 sends the updated 5QI rules for each classified cell group to the PCF 18 for enforcement in the network, according to known protocols and procedures. The POF 30 both improves QoS by applying more stringent 5QIs to underperforming classified cell groups, and reserves network resources by applying less stringent 5QIs to classified cell groups that exceed the target QoE for traffic classes by a predetermined margin. QoS policy optimization may be performed only after each iteration of cell classification, such as once per day. Optionally, the QoS policy optimization may be performed more often, such as hourly, to more closely track changes in network utilization.

When a UE 10 enters a new cell, which has been classified into a group different from the prior cell in which the UE 10 operated, the PCF 18 updates the QoS policy rules for the UE 10 to those that are currently in force for the cell group into which the new cell is classified. This process is well defined, and can be executed quickly with minimal network overhead. Accordingly, the updating of mobile UEs 10 to the QoS policy rules of their new cells is ongoing, and can be executed as necessary in response to UE 10 mobility.

Those of skill in the art will recognize that, although network data analysis and cell classification, and QoS policy optimization, have been described as being performed by separate functions—namely, the RNDA-CCF 28 and POF 30, respectively—this division is exemplary only, and is not a limit of embodiments of the present invention. Given the teachings of the present disclosure, those of skill in the art may readily implement the tasks and method steps described herein in one, two, or more network functions, which may be implemented on any number of physical network nodes.

The procedures summarized above will now be explained in greater detail. Network data, including radio network and traffic load parameters, are collected from RRC measurements data and subscriber related cell trace radio events. Because the uplink and downlink channels of the air interface experience different performance, and are influenced by different network parameters, in one embodiment the cell classification is performed separately for the uplink and downlink. Generally, the most important downlink parameters include:

Reference Signal Received Power (RSRP), characterizing the received signal strength;

Reference Signal Received Quality (RSRQ), characterizing the interference;

Active UE per cell, simultaneously active UE in a cell;

Downlink throughput per cell, load DL in a cell; and

Downlink Hybrid Automatic Repeat Request (HARQ) rate, characterizing the PRB retransmission of the HARQ process.

Correspondingly, the most important uplink parameters include:

UL Power restrictions, ratio UEs transmitting at max power;

Uplink Signal to Interference and Noise Ratio (SINR), signal to noise ratio in UL direction;

Active UE per cell, simultaneously active UE in a cell;

Uplink throughput per cell; and

Uplink HARQ rate.

While these are generally the most important parameters to consider, this list is not limiting, and other downlink and/or uplink parameters may be considered as well. Furthermore, the cell classification and QoS policy optimization described herein can be performed, in different embodiments, considering both uplink and downlink channels together, or considering only one of the two.

The RNDA-CCF 28 continuously receives the service quality (QoE) the characterizing radio parameters, and network parameters such as traffic load, for all network cells, and determines the correlation between the service quality and the radio and network parameters. The QoE is primarily obtained from external service application servers 22, through AF 24, as depicted in FIG. 1. Alternatively, QoE may be estimated by a machine learning (ML) model based on QoS parameters measured by the UPF 16, or calculated by a formula if it is available for a service type. In all cases, the QoE is obtained independently from the radio parameters, and they are correlated in the RNDA-CCF 28.

Figure 2:
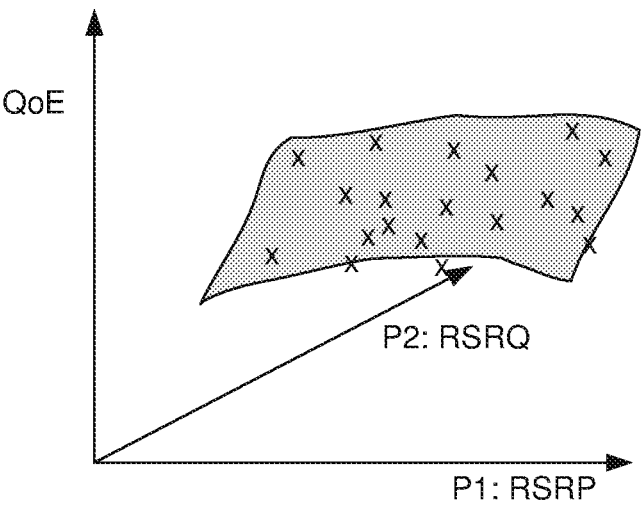
FIG. 2 is a graph of QoE as a function of two radio parameters.

The received QoE values are represented as a function of the measured radio network and traffic load parameters. In an n dimensional network parameter set, an n-dimensional surface is fit to the QoE points. This is depicted in FIG. 2 for the simplified example of two parameters: P1=RSRP and P2=RSRQ. This surface indicates an overall dependency of the service quality to the different parameters.

Figure 3:
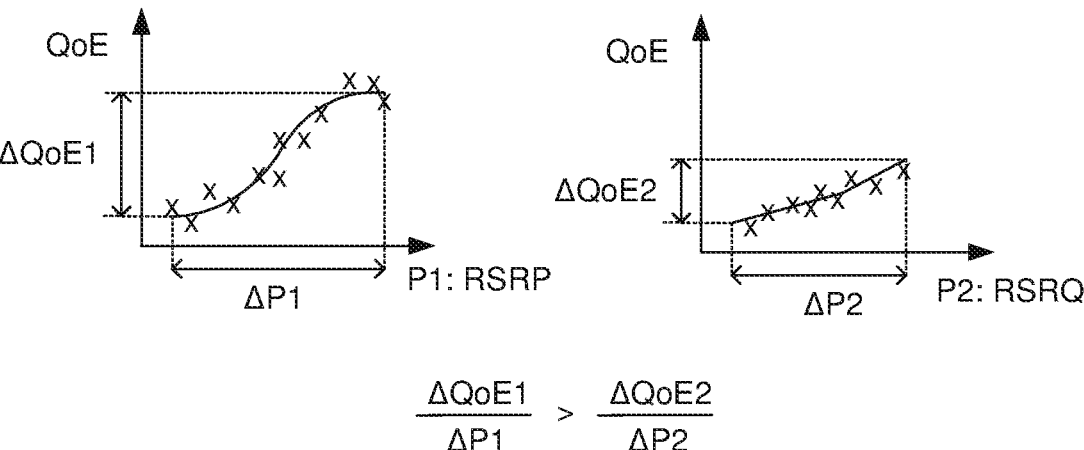
FIG. 3 depicts two graphs showing determination of the significance of radio parameters.

To constrain the computational complexity, the number of instances for which the POF 30 should run is limited by considering only the most significant radio network and traffic load parameters, with significance defined as their influence on the QoE. Furthermore, the network parameters in the subset of the most significant parameters are ranked, again by their influence on the QoE. FIG. 3 depicts one method of ranking parameters: comparing the metric $\Delta QoE/\Delta p$, where the range of values of parameter p is normalized, to allow for direct comparison among different parameters. For example, FIG. 3 depicts a large difference in QoE for different values of p1 over a normalized range. In contrast, the variation in QoE over the normalized range of values of p2 is much less. Accordingly, $$\frac{\Delta QoE_1}{\Delta p_1} > \frac{\Delta QoE_2}{\Delta p_2}$$

and the parameter $p_1$ ranks higher than the parameter $p_2$.

Figure 4:
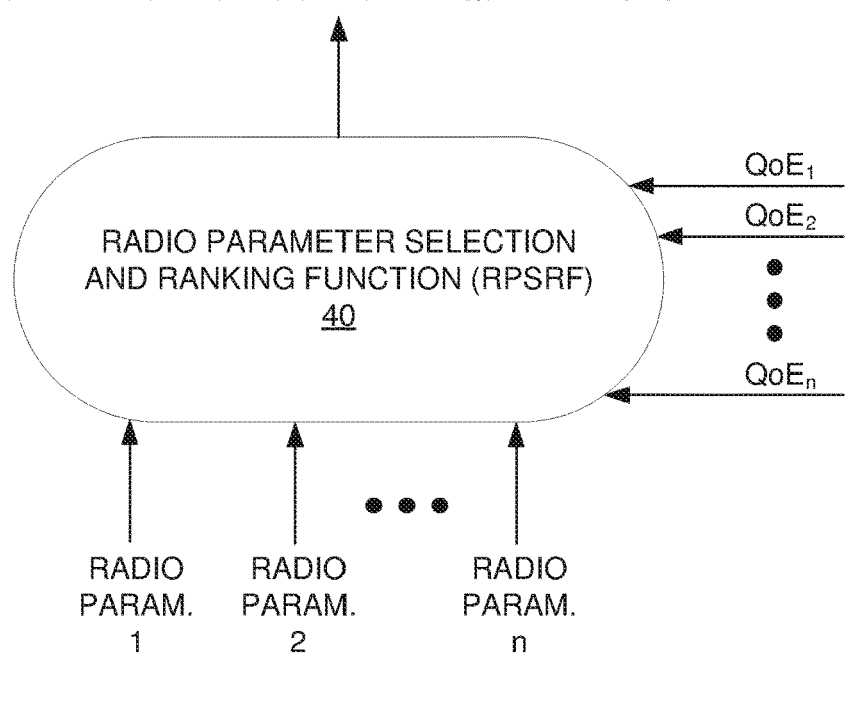
FIG. 4 is a block diagram of the inputs and outputs of a radio parameter selection and ranking function.

FIG. 4 depicts the inputs and outputs of a Radio Parameter Selection and Ranking Function (RPSRF) 40, which may be implemented as part of the RNDA-CCF 28. The RPSRF 40 takes as input all n radio parameters considered, and the associated n QoEs, and outputs a ranked list of a subset of the n parameters which contribute the most to changes in QoE.

To further constrain the computational complexity, the number of instances for which the PO 30 should run is further limited by considering only a plurality of value ranges for each selected parameter. For example, three value ranges may be defined, differentiated on the definite or possible effect on service quality of a parameter being in each range—the three ranges may be conceptualized as "good," "bad," and "fair" values for that parameter. Quantitatively, the differentiation may be determined by whether the parameter being within that range definitely or possibly causes service degradation, or definitely does not. For example, bad: over this range of values, the parameter definitely causes service quality;

good: over this range of values, the parameter cannot be the root cause of service degradation; and fair: a range between the bad and good. Over this range, the parameter value is not optimum, and could cause service degradation.

The values for some network parameters may be divided into three such ranges by establishing two predetermined thresholds, based on technical criteria. For example, network analysis may determine the threshold values at which a parameter does or does not (or may) affect service quality. As one example, the ranges for RSRP may be defined as:

bad: RSRP<−120 dBm;

fair: −120 dBm≤RSRP≤−90 dBm; and good: RSRP>−90 dBm.

As another example, the ranges for RSRQ may be defined as:

bad: RSRQ<−12 dB;

fair: −12 dB≤RSRQ≤−9 dB; and good: RSRQ>−9 dB.

Some network parameters are not amenable to differentiation by objective technical threshold values. In these cases, one approach to dividing the network parameter values into ranges is to rank a number of cells, by QoE, in which the parameter has a different value, and establish two percentile thresholds (for three ranges) based on the cell ranking. For example, to determine value ranges for the number of UEs active in a cell, such as during a peak hour:

bad: number of active UEs in the worst 5% of cells by QoE;

fair: number of active UEs in the second worst 5% of cells by QoE; and good: number of active UEs in the other 90% of cells.

Figure 5:
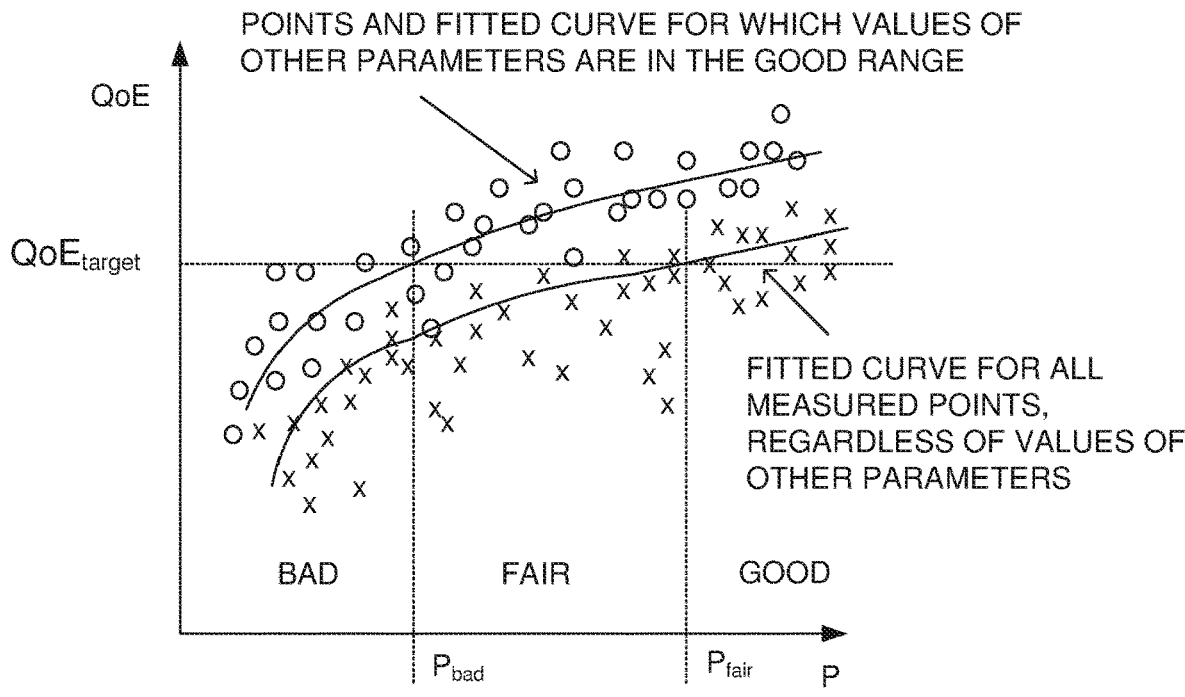
FIG. 5 is a graph depicting one means of defining thresholds for determining value ranges for a radio parameter.

Yet another method of dividing the value range of a network parameter into, e.g., three value ranges is to compare QoE for different parameter conditions, and fitting a curve of QoE as a function of a specific parameter. Assume that the threshold values, dividing parameters into value ranges, are known for all parameters but one. FIG. 5 depicts the process for determining corresponding threshold values for the one parameter for which value ranges are not established. Measured QoE is plotted for all values of the unknown parameter P, for all values of all other parameters. Two curves are then fitted to the data—one for values of P for which the QoE was measured with all other parameters in their own "good" range, and one for values of P for which the QoE was measured with all other parameters ranging over their entire value ranges. The value of P for which the "other parameters all good" curve intersects the QoE target may be taken as $P_{bad}$. That is, with all other parameters in the "good" range, the value $P_{bad}$ and lower values of P cause the QoE to fall below its target. Quantitatively, $QoE_{target}=QoE=(p_1=good, p_2=good, \ldots, P_{bad}, \ldots, p_n=good)$, where "$p_1=good, p_2=good, \ldots, P_{bad}, \ldots, p_n=good$" means the QoE function is determined for the measured points for which the known parameters $p_1$, $p_2, \ldots, p_n$ had values in their respective good ranges, and excusing the measured points for which the known parameters had values in their respective fair or bad range.

Similarly, the value of P for which the "other parameters have all values" curve intersects the QoE target may be taken as $P_{fair}$. That is, with all other parameters varying over all of their respective ranges, the value $P_{fair}$ and higher values of P cause the QoE be above its target—consequently, these values of P cannot cause service degradation. Quantitatively, $QoE_{target}=QoE=(p_1=any, p_2=any, \ldots, P_{fair}, \ldots p_n=any)$, where "$p_1=any, p_2=any, \ldots, P_{bad}, \ldots, p_n=any$" means the QoE function is determined for all measured points, regardless of the values of the known parameters $p_1$, $p_2, \ldots, p_n$.

After the RNDA-CCF 28 has gathered radio network and traffic load parameters, ranked them by their influence on QoE, selected a subset of the highest ranked parameters, and determining a plurality of value ranges for each of the selected parameters (e.g., three), the RNDA-CCF 28 then classifies the cells into groups based on the value ranges of the selected parameters. For example, all networks within the cell for which the download channel is characterized by [RSRP: good, RSRQ: bad, Load: medium] would be grouped together. The POF 30 will then optimize a QoS policy for this group of cells—regardless of how many cells are in the group, where the cells are distributed geographically, or other factors—and forward 5QI rules for the cells in this group to the PCF 18 for enforcement of a QoS policy that achieves the target QoE for the high priority traffic in these cells.

In the representative case that the number of parameters selected n is the same, and that each parameter is divided into the same number of value ranges r—although neither condition is a limit on embodiments of the present invention—the number of possible cell classifications is $r^n$. For example, where the four most significant parameters are considered, and the good/fair/bad value range is used, the number of classifications is $r^n=3^4=81$, e.g., for the downlink channel. If the same number of parameters and ranges are considered in classifying cells by the uplink channel, the number of classifications is 162. In general, not all the classifications will have cells grouped into them, as not all permutations of all values of all parameters will occur in a network.

The number of classifications may be further reduced by merging classifications. If the determined optimized QoS policies are the same for two or more classified cell groups over a predetermined duration, the groups may be merged for the purpose of QoS policy management. For example, the cell classifications

[RSRP: good, RSRQ: bad, Load: medium] and

[RSRP: good, RSRQ: bad, Load: low]

may be merged if the 5QI rules generated by the POF 30 for the two classified cell groups are the same over a duration. This may occur because one parameter dominates. In this example, the RSRQ parameter drives the QoS policy, whether a cell carries a low or medium load. However, if a high cell load, for the same other parameter value ranges, would result in a different QoS policy, then the classification

[RSRP: good, RSRQ: bad, Load: high]

would not be merged.

The received QoE feedback data and measured QoS parameters are aggregated for each classified cell group. Policy optimization is performed separately for each classified cell group, to achieve a target QoE, at least for high priority traffic classes. The following pseudocode implements a representative QoS policy optimization algorithm:

If (% of Subscribers satisfying QoE target for a SLA traffic is smaller than the SLA target (e.g. 90%))

```
For each cell group:
    If QoE_actual (Cell group) < QoE_target
        Find better 5QI_cell group for SLA traffic for the given cell group
    If QoE_actual > QoE_target + δ
        Find worse 5QI_cell group for SLA traffic for the given cell group
During operation, for each SLA session, identify the cell group where the UE is
    If (5QI_actual != 5QI_cell group)
        5QI_actual := 5QI_cell group
        Change 5QI mapping in PCF
```

Figure 6:
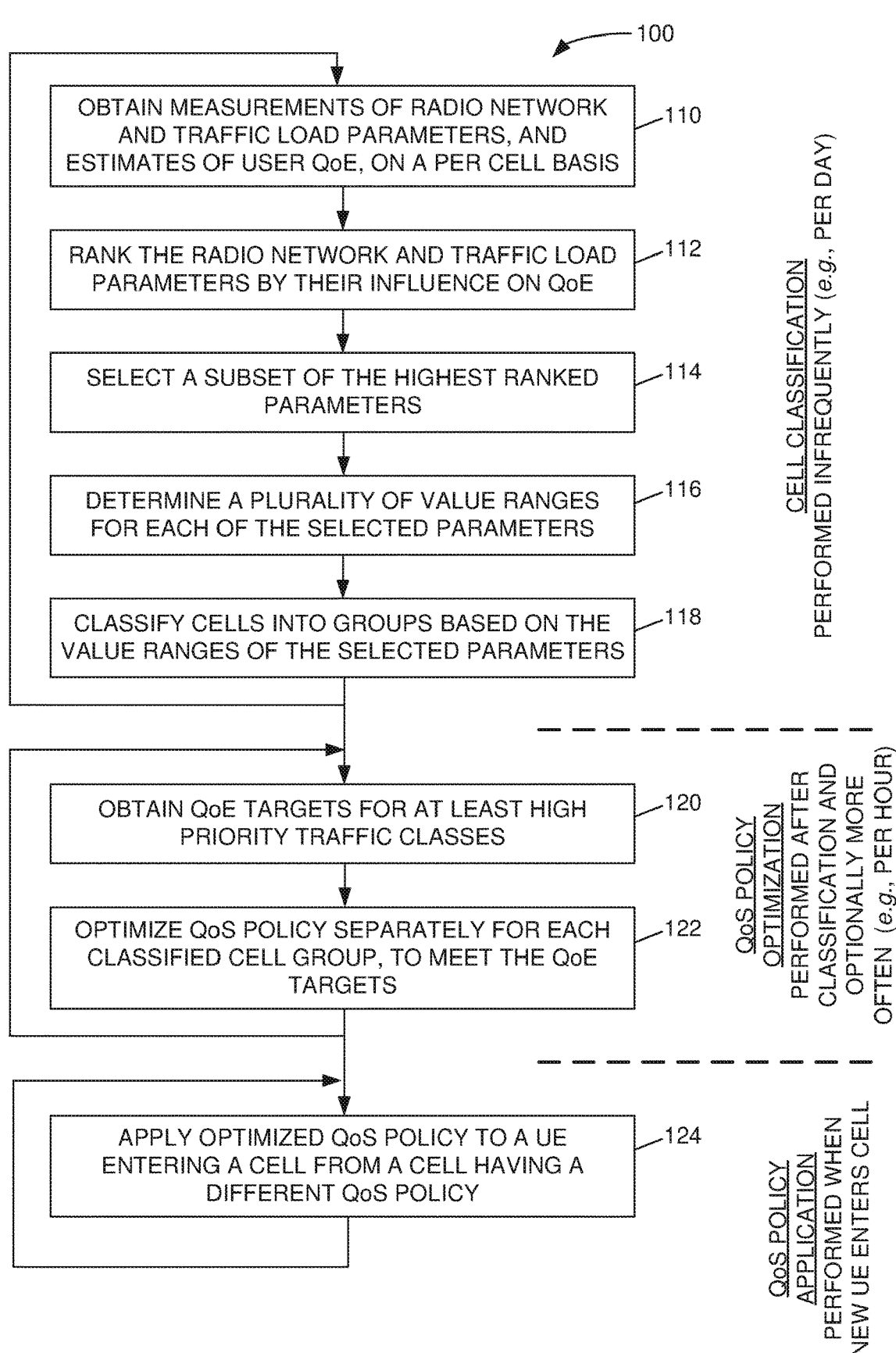
FIG. 6 is a flow diagram of a method of cell classification and QoE policy optimization and application.

FIG. 6 depicts the overall method 100 of QoS policy management, according to embodiments of the present invention. As depicted, the method 100 can be considered to comprise three processes. Some of all of the processes may be performed with different frequencies of iteration, depending on the size and utilization of the network, radio conditions, available computational resources, SLA demands, and the like. The three processes are cell classification, QoS policy optimization, and QoS policy application. In some embodiments, these three processes may be performed by different network functions (which may be implemented on the same or different physical network nodes). For example, as depicted in FIG. 1, in some embodiments the cell classification may be performed by an RNDA-CCF 28; QoS policy optimization may be performed by a POF 30, and QoS policy application may be performed by a PCF 18. However, this division of tasks is not a limitation of embodiments of the present invention, and those of skill in the art will readily realize that the entire method 100 may be performed by the same network function, or by different network functions but by grouping the method steps differently than shown.

The cell classification process may be performed infrequently, such as daily. Alternatively, it can be performed more often, such as hourly, to adapt QoS policy to changes in network utilization throughout the day. Furthermore, cell classification may be triggered to occur leading up to and through known or anticipated heavy cell utilization, such as for scheduled sporting events, concerts, parades, and the like. The QoS policy optimization process is normally performed following every instance of cell classification, but may additionally be performed more often, such as hourly in embodiments where the cells are classified daily. QoS policy application will occur after every QoS policy optimization, of course, and additionally it is ongoing, and may be performed dynamically, such as whenever a UE enters a cell having a different QoS policy than that UE's previous cell.

In the cell classification process, measurements of radio network and traffic load parameters, and estimates of user QoE, are obtained, on a per cell basis (block 110). The radio network and traffic load parameters are ranked by their influence on QoE (block 112). A subset of these parameters, consisting of only the highest ranked few parameters (e.g., 3 or 4), is selected (block 114). A plurality of value ranges is determined for each of the selected parameters (block 116). The value ranges may be based on the possibility or certainty or that the parameter will (or will not) cause a degradation in service quality. In one embodiment, three such parameter value ranges are used, representing "good," "fair," and "bad" values. The network cells are then classified into groups, based on the value ranges of the selected parameters (block 118). In this manner, the QoS of groups of cells experiencing the same or similar radio conditions and/or traffic load may be managed together. This approach provides more optimized QoS management than policies applied globally across the network, but without the computational load (and dearth of data) of managing QoS for each cell individually.

In the QoS policy optimization process, QoE targets are obtained for at least high priority traffic classes (block 120). These may be obtained, for example, from SLAs 34 or other target setting mechanisms in an SoC 32. QoS policy for the high priority traffic classes is then optimized separately for each classified cell group, to meet the QoE targets (block 122). QoS policy may comprise determining more or less stringent 5QI rules to apply to a classified cell group, to bring actual user QoE in line with the QoE target. This ensures that sufficient network resources are applied to at least high priority traffic flows in cells with high load and/or poor radio conditions, and also that network resources are reserved in cells having good radio conditions.

In the QoS policy application process, the new, optimized QoS policies are applied to all cells in each classified cell group (not shown). Thereafter, in an ongoing process, when a new UE is handed over to a target cell having a different QoS policy than the UE's handover source cell, the PCF 18 enforces the optimized QoS policy for the classified cell group into which the handover target cell has been classified (block 124). In this manner, a QoS policy optimized to obtain a target QoE in a cell is enforced to at least all high priority traffic flows in the cell.

Apparatuses described herein may perform the method 100 herein, and any other processing, by implementing any functional means, modules, units, or circuitry. In some embodiments, for example, the apparatuses comprise respective circuits or circuitry configured to perform the steps shown in FIG. 6. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
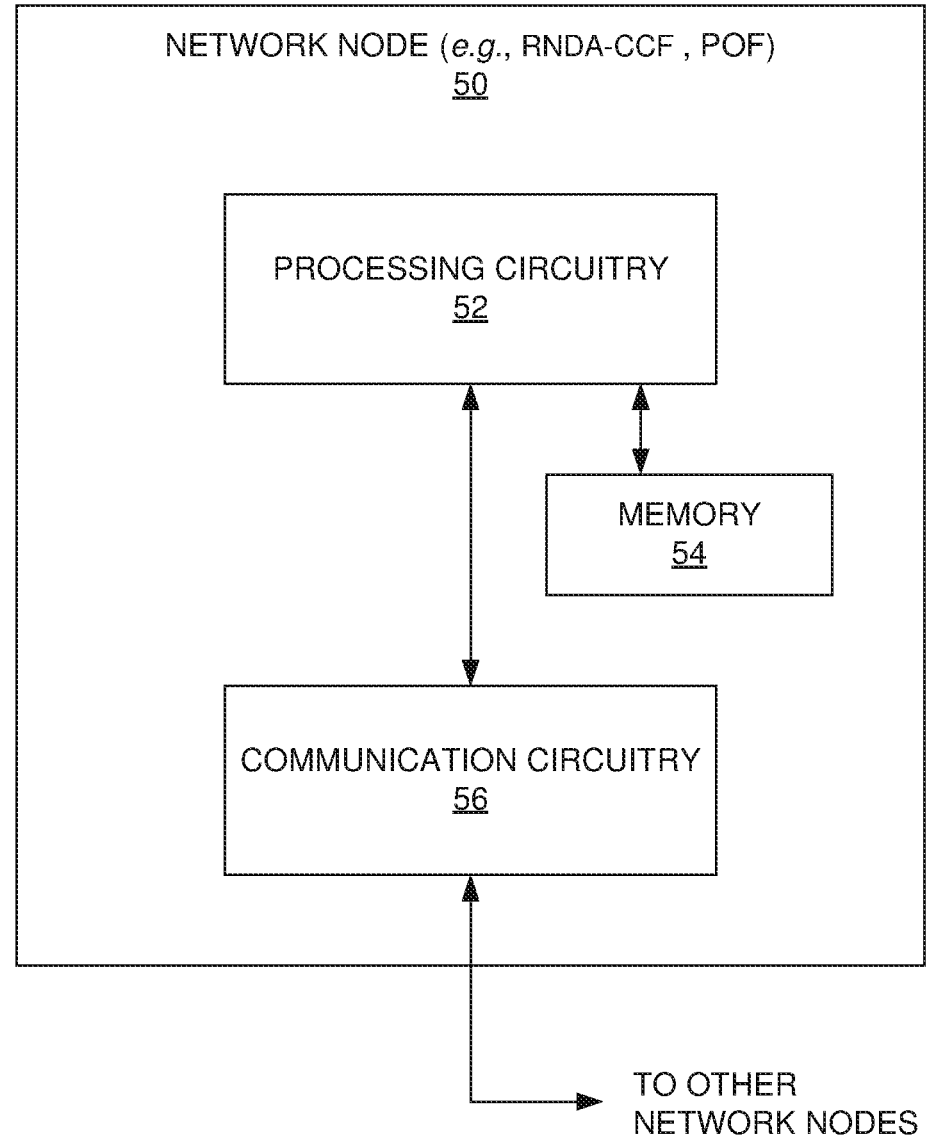
FIG. 7 is a hardware block diagram of a network node.

FIG. 7 for example is a hardware block diagram illustrating a network node 50 as implemented in accordance with one or more embodiments. The network node 50 may be configured to implement network functions, such as an RNDA-CCF 28 or POF 30. As shown, the network node 50 includes processing circuitry 52 operatively coupled to memory 54 and communication circuitry 56. The communication circuitry 56 is configured to transmit and/or receive information to and/or from one or more other nodes, e.g., via any communication technology. The processing circuitry 52 is configured to perform processing described herein, such as by executing instructions stored in memory 54. The processing circuitry 52 in this regard may implement certain functional means, units, or modules.

Figures 8, 9:
FIG. 8 is a functional block diagram of a radio data aggregation and cell classification function.
FIG. 9 is a functional block diagram of a QoS policy optimization function.

FIG. 8 illustrates a functional block diagram of a Radio and Network Data Analytics and Cell Classification Function (RNDA-CCF 29) in a wireless network, according to embodiments of the present invention. The RNDA-CCF 29 may be implemented, for example, in a network node 50 as illustrated in FIG. 7. The RNDA-CCF 29 implements various functional means, units, or modules, e.g., via the processing circuitry 52 in FIG. 7 and/or via software code. These functional means, units, or modules, e.g., for implementing the method 100 herein, include for instance: network parameters and QoE obtaining unit 60, network parameters ranking unit 62, parameter selecting unit 64, value range determining unit 66, and cell classifying unit 68.

Network parameters and QoE obtaining unit 60 is configured to obtain measurements of radio network and traffic load parameters, and estimates of user QoE, on a per cell basis. Network parameters ranking unit 62 is configured to rank the radio network and traffic load parameters by their influence on QoE. Parameter selecting unit 64 is configured to select a subset of the highest ranked parameters. Value range determining unit 66 is configured to determine a plurality of value ranges for each of the selected parameters. Cell classifying unit 68 is configured to classify cells into groups based on the value ranges of the selected parameters.

FIG. 9 illustrates a functional block diagram of a Policy Optimization Function (POF 30) in a wireless network, according to embodiments of the present invention. The POF 30 may be implemented, for example, in a network node 50 as illustrated in FIG. 7. The POF 30 implements various functional means, units, or modules, e.g., via the processing circuitry 52 in FIG. 7 and/or via software code. These functional means, units, or modules, e.g., for implementing the method 100 herein, include for instance: QoE targets obtaining unit 70 and QoS policy optimizing unit 72.

QoE targets obtaining unit 70 is configured to obtain QoE targets for at least high priority traffic classes. QoS policy optimizing unit 72 is configured to optimize QoS policy for the high priority traffic classes, separately for each classified cell group, to meet the QoE targets.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Embodiments of the present invention present numerous advantages over the prior art. They ensure QoEs specified in SLAs (or other quality targets determined by Service Operation) by automatically adapting to different radio and load conditions in the network cells. If the QoE targets are violated, the SLA traffic is automatically mapped to a higher priority 5QI class only for the affected cells, providing better QoS (packet-level) service until QoE target is met. On the other hand, if the measured QoE is better than the target value (by a selectable amount), the traffic is mapped to a lower priority 5QI class in the affected cells, ensuring optimum resource usage in the RAN and CN. Since the radio and load conditions of the cells can be very different, the embodiments of the present invention, applying different policies to different cell conditions, are more resource-efficient from the point of view of the network resources (scheduling priority, physical resource blocks, etc.), compared to a conventional method, such as applying a uniform global policy. Furthermore, QoE targets are ensured in problematic cells, unlike the global optimization approach, in which QoE can remain below target in problematic cells and much better than target in cells with good radio conditions. The per-classified-cell-group optimized QoS policies are configured in the PCF 18 using existing functionality and standardized network protocols. Accordingly, their application and enforcement is very fast, with low overhead, and can be executed whenever a new UE enters the cell.

As disclosed above, according to embodiments of the present invention the cell classification process continuously measures the radio and load conditions of the cells, and classifies cells into a relatively small number of groups. There are at least three significant advantages to this approach: (i) the algorithm takes into account the wide variation of cells and load conditions, leading to a more optimum policy mapping in network level than a global algorithm; (ii) the algorithm does not run per cell (which would require too high processing capacity); and (iii) within the cell groups, there are large enough measurement samples for adequate policy decision and stable operation of the optimization loop. In some embodiments, the algorithm can be run every hour, and it adopts the QoS policies to the daily traffic change (traffic profile) as well.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. As used herein, the term "configured to" means set up, organized, adapted, or arranged to operate in a particular way; the term is synonymous with "designed to." As used herein, the term "substantially" means nearly or essentially, but not necessarily completely; the term encompasses and accounts for mechanical or component value tolerances, measurement error, random variation, and similar sources of imprecision.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of classifying cells in a wireless communication network for Quality of Service (QoS) policy optimization, the method characterized by:

obtaining, per cell, measurements of radio network and traffic load parameters, and estimates of user Quality of Experience (QoE);

ranking the radio network and traffic load parameters by their influence on QoE;

selecting a subset of the highest ranked parameters;

determining a plurality of value ranges for each of the selected parameters; and classifying cells into groups based on the value ranges of the selected parameters.

2. The method of claim 1 further characterized by:

obtaining QoE targets for at least high priority traffic classes; and optimizing QoS policy for the high priority traffic classes, separately for each classified cell group, to meet the QoE targets.

3. The method of claim 2, further characterized by implementing the optimized QoS policy for each cell in each classified cell group through a network Policy Charging Function.

4. The method of claim 3, further characterized by applying a cell's optimized QoS policy to a User Equipment entering the cell from a cell having a different QoS policy.

5. The method of claim 2 wherein optimizing QoS policy for the high priority traffic classes separately for each classified cell group to meet the QoE targets comprises, separately for each classified cell group:

if the estimated QoE for the high priority traffic classes is less than the target QoE, applying a more stringent QoS Indicator; and if the estimated QoE for the high priority traffic classes exceeds the target QoE by a predetermined threshold or more, applying a less stringent QoS Indicator.

6. The method of claim 2 further characterized by merging two categorized cell groups if the determined polices in each group are the same over a predetermined duration.

7. The method of claim 1 wherein ranking the radio network and traffic load parameters by their influence on QoE comprises:

for each parameter, calculating a ratio of a change in QoE per change in parameter value over a normalized value range of the parameter values;

comparing the ratios; and ranking each parameter according to its associated ratio.

8. The method of claim 1 wherein determining the plurality of value ranges for each of the selected parameters comprises determining three value ranges, wherein:

the parameter values over a first range cause a QoS degradation;

the parameter values over a second range cannot cause a QoS degradation; and the parameter values over a third range lie between the first and second ranges, and the parameter values over the third range could cause a QoS degradation.

9. The method of claim 1 wherein determining the plurality of value ranges for each of the selected parameters comprises one of:

applying predetermined thresholds to the parameter values; and ranking a plurality of cells by the measured values of a parameter and dividing the parameter values into ranges according to predetermined percentile values of the cell ranking.

10. The method of claim 1 wherein determining the plurality of value ranges for an identified one of the selected parameters comprises:

determining the plurality of value ranges for selected parameters other than the identified selected parameter;

determining a threshold value for the first range of the identified parameter by fitting a QoE curve as a function of the identified parameter wherein all other selected parameter values are in the second range and wherein the threshold value for the first range of the identified parameter is the value at which the fitted QoE curve equals a target QoE; and determining a threshold value for the third range of the identified parameter by fitting a QoE curve as a function of the identified parameter using all other selected parameter values and wherein the threshold value for the third range of the identified parameter is the value at which the fitted QoE curve equals the target QoE.

11. A network node operative in a wireless communication network in which Quality of Service (QoS) policies are enforced, characterized by:

communication circuitry configured to communicate with other network nodes; and processing circuitry operatively connected to the communication circuitry and configured to:

obtain, per cell, measurements of radio network and traffic load parameters, and estimates of user Quality of Experience (QoE);

rank the radio network and traffic load parameters by their influence on QoE;

select a subset of the highest ranked parameters;

determine a plurality of value ranges for each of the selected parameters; and classify cells into groups based on the value ranges of the selected parameters.

12. The network node of claim 11, wherein the processing circuitry is further configured to:

obtain QoE targets for at least high priority traffic classes; and optimize QoS policy for the high priority traffic classes, separately for each classified cell group, to meet the QoE targets.

13. The network node of claim 12, wherein the processing circuitry is further configured to implement the optimized QoS policy for each cell in each classified cell group through a network Policy Charging Function.

14. The network node of claim 13, wherein the processing circuitry is further configured to apply a cell's optimized QoS policy to a User Equipment entering the cell from a cell having a different QoS policy.

15. The network node of claim 12 wherein the processing circuitry is configured to optimize QoS policy for the high priority traffic classes separately for each classified cell group to meet the QoE targets by, separately for each classified cell group:

if the estimated QoE for the high priority traffic classes is less than the target QoE, applying a more stringent QoS Indicator; and if the estimated QoE for the high priority traffic classes exceeds the target QoE by a predetermined threshold or more, applying a less stringent QoS Indicator.

16. The network node of claim 12 wherein the processing circuitry is further configured to merge two categorized cell groups if the determined QoS polices in each group are the same over a predetermined duration.

17. The network node of claim 11, wherein the processing circuitry is configured to rank the radio network and traffic load parameters by their influence on QoE by:

for each parameter, calculating a ratio of a change in QoE per change in parameter value over a normalized value range of the parameter values;

comparing the ratios; and ranking each parameter according to its associated ratio.

18. The network node of claim 11 wherein the processing circuitry is configured to determine the plurality of value ranges for each of the selected parameters by determining three value ranges, wherein:

the parameter values over a first range cause a QoS degradation;

the parameter values over a second range cannot cause a QoS degradation; and the parameter values over a third range lie between the first and second ranges, and the parameter values over the third range could cause a QoS degradation.

19. The network node of claim 11 wherein the processing circuitry is configured to determine the plurality of value ranges for each of the selected parameters by one of:

applying predetermined thresholds to the parameter values; and ranking a plurality of cells by the measured values of a parameter and dividing the parameter values into ranges according to predetermined percentile values of the cell ranking.

20. The network node of claim 11 wherein the processing circuitry is configured to determine the plurality of value ranges for an identified one of the selected parameters by:

determining the plurality of value ranges for selected parameters other than the identified selected parameter;

determining a threshold value for the first range of the identified parameter by fitting a QoE curve as a function of the identified parameter wherein all other selected parameter values are in the second range and wherein the threshold value for the first range of the identified parameter is the value at which the fitted QoE curve equals a target QoE; and determining a threshold value for the third range of the identified parameter by fitting a QoE curve as a function of the identified parameter using all other selected parameter values and wherein the threshold value for the third range of the identified parameter is the value at which the fitted QoE curve equals the target QoE.

* * * * *